(12) United States Patent
Kokotovic et al.

(10) Patent No.: US 11,001,119 B2
(45) Date of Patent: May 11, 2021

(54) VEHICLE SHOCK ABSORBER

(71) Applicant: Ford Global Technologies, LLC, Dearborn, MI (US)

(72) Inventors: Vladimir V. Kokotovic, Dearborn, MI (US); Hongtei Eric Tseng, Canton, MI (US); Li Xu, Northville, MI (US); Kyle Simmons, New Boston, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 264 days.

(21) Appl. No.: 16/100,050

(22) Filed: Aug. 9, 2018

(65) Prior Publication Data
US 2020/0047581 A1    Feb. 13, 2020

(51) Int. Cl.
| | |
|---|---|
| *B60G 13/08* | (2006.01) |
| *B60G 17/0195* | (2006.01) |
| *B60G 17/08* | (2006.01) |
| *F16F 15/027* | (2006.01) |
| *F16F 15/02* | (2006.01) |
| *F16F 1/44* | (2006.01) |
| *B60K 5/12* | (2006.01) |

(52) U.S. Cl.
CPC ......... *B60G 17/0195* (2013.01); *B60G 13/08* (2013.01); *B60G 17/08* (2013.01); *F16F 15/022* (2013.01); *F16F 15/0275* (2013.01); *B60K 5/1283* (2013.01); *F16F 1/445* (2013.01)

(58) Field of Classification Search
CPC .... B60G 17/0195; B60G 17/08; B60G 13/08; B60G 13/16; B60G 13/18; F16F 15/022; F16F 15/0275; B60K 5/1283
See application file for complete search history.

(56) References Cited

U.S. PATENT DOCUMENTS

| | | | | |
|---|---|---|---|---|
| 2,861,795 A | * | 11/1958 | Blake | F16F 13/00 267/225 |
| 3,178,167 A | * | 4/1965 | Loewis Of Menar | B60G 17/044 267/64.21 |
| 3,290,035 A | * | 12/1966 | Enke | B60G 15/00 267/225 |
| 4,154,461 A | * | 5/1979 | Schnittger | B60G 15/06 267/218 |
| 4,746,106 A | * | 5/1988 | Fukumura | F16F 9/468 267/218 |
| 4,786,037 A | * | 11/1988 | Mills | B60G 15/061 188/322.14 |
| 5,106,053 A | * | 4/1992 | Miller | F16F 9/46 251/129.05 |
| 5,163,538 A | * | 11/1992 | Derr | F16F 9/46 188/266.6 |

(Continued)

FOREIGN PATENT DOCUMENTS

| | | |
|---|---|---|
| DE | 4116270 C2 | 1/2002 |
| JP | 2000120770 A | 4/2000 |

*Primary Examiner* — Vishal R Sahni
(74) *Attorney, Agent, or Firm* — Raymond L. Coppiellie; Bejin Bieneman PLC

(57) ABSTRACT

A vehicle shock absorbing system includes a wheel, a vehicle body, a first absorber, a dynamic absorber, and a third absorber. The third absorber is attached to the vehicle body. The first absorber is between the third absorber and the wheel. The dynamic absorber is attached to the wheel and includes a dynamic absorber mass and a spring.

15 Claims, 15 Drawing Sheets

(56) References Cited

U.S. PATENT DOCUMENTS

| | | | | |
|---|---|---|---|---|
| 5,222,759 A | * | 6/1993 | Wanner | B60G 17/04 280/124.158 |
| 5,392,882 A | * | 2/1995 | Mackovjak | B60G 13/18 188/266.2 |
| 5,476,161 A | * | 12/1995 | Tang | B60G 17/08 188/266.5 |
| 5,477,947 A | | 12/1995 | Schalles et al. | |
| 5,819,802 A | * | 10/1998 | Fan | F16L 55/055 138/31 |
| 6,902,156 B2 | | 6/2005 | Muramatsu et al. | |
| 7,290,644 B2 | | 11/2007 | Miyake | |
| 9,969,231 B2 | * | 5/2018 | Marble | B60G 13/08 |
| 2007/0278028 A1 | * | 12/2007 | Fought | B60G 15/12 180/282 |
| 2010/0117277 A1 | * | 5/2010 | Ohta | F16F 7/10 267/140.14 |
| 2015/0046031 A1 | | 2/2015 | Gagliano et al. | |
| 2015/0259028 A1 | * | 9/2015 | Ishikawa | B60G 17/018 280/6.152 |
| 2016/0059664 A1 | * | 3/2016 | Tucker | B60G 17/04 280/124.159 |
| 2016/0229255 A1 | * | 8/2016 | Teraoka | B60G 15/061 |
| 2016/0288605 A1 | * | 10/2016 | Teraoka | B60G 15/061 |
| 2016/0348749 A1 | * | 12/2016 | Carcaterra | B60G 17/033 |
| 2018/0105010 A1 | * | 4/2018 | Krishnan | F16F 9/54 |
| 2018/0238415 A1 | * | 8/2018 | Hansmann | F16F 13/30 |
| 2019/0308484 A1 | * | 10/2019 | Belter | B60G 17/0408 |
| 2020/0039316 A1 | * | 2/2020 | Belter | F16F 15/005 |

\* cited by examiner

VEHICLE SHOCK ABSORBER

BACKGROUND

A vehicle endures vibrations when traveling. For example, uneven road surfaces may cause a wheel to move vertically, causing the wheel and a body to vibrate. The vibrations may propagate through other vehicle components and may be felt by occupants. The wheel has a different resonant frequency of vibration than a resonant frequency of vibration of the body. Increasing absorption of vibrations at the resonant frequency of the body may reduce absorption of vibrations at the resonant frequency of the wheel.

The vehicle may include a suspension system to absorb the vibrations. However, the different characteristic frequencies may be difficult for the suspension system to adequately absorb. There remains an opportunity to design a shock absorbing system for a vehicle that absorbs vibrations of a wide range of frequencies and magnitudes to address competing vibrations of the wheel and of the vehicle body.

DETAILED DESCRIPTION

Figure 1:
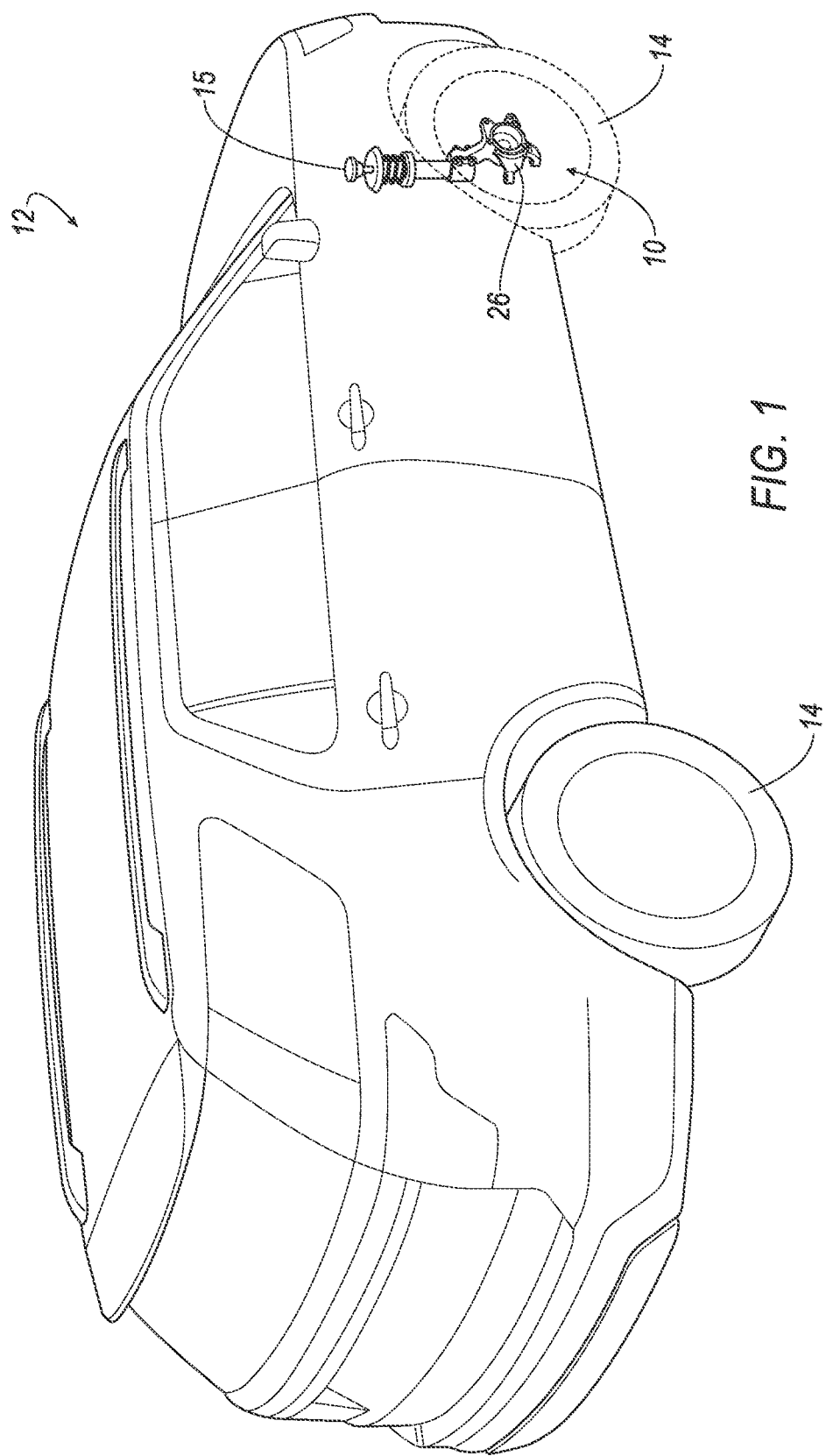
FIG. 1 is a perspective view of a vehicle including a plurality of shock absorbers.

A system includes a wheel, a vehicle body, a first absorber, a dynamic absorber, and a third absorber. The third absorber is attached to the vehicle body. The first absorber is between the third absorber and the wheel. The dynamic absorber is attached to the wheel. The dynamic absorber includes a dynamic absorber mass and a spring.

The first absorber may include a solenoid valve.

The dynamic absorber may define an annular cavity. The dynamic absorber mass may be disposed in the annular cavity.

The dynamic absorber may be attached to the wheel in parallel with the first absorber.

The dynamic absorber may be disposed around an outer surface of the first absorber.

The dynamic absorber may be coaxial with the first and third absorbers.

The first absorber may be a semi-active shock absorber.

The first absorber may be designed to dampen a plurality of frequencies in a first frequency range. The dynamic absorber may be designed to dampen a plurality of frequencies in a second frequency range. The third absorber may be designed to dampen a plurality of frequencies in a third frequency range. The second frequency range may include at least one frequency not in either of the first frequency range and the third frequency range.

The wheel has a wheel resonant frequency and the second frequency range may include the wheel resonant frequency.

The vehicle body has a body resonant frequency and the first frequency range may include the body resonant frequency.

The first absorber may include a first fluid chamber and a second fluid chamber.

The system may further include a solenoid valve connecting the first fluid chamber to the second fluid chamber.

The first absorber, the dynamic absorber, and the third absorber may be unitary.

A system includes a semi-active shock absorber and a dynamic absorber. The dynamic absorber includes a spring and a dynamic absorber mass, the dynamic absorber disposed coaxially with the semi-active shock absorber.

The semi-active shock absorber may include a first fluid chamber and a second fluid chamber.

The system may further include a solenoid valve connecting the first fluid chamber to the second fluid chamber.

The semi-active shock absorber may be designed to reduce a magnitude of vibrations having frequencies in a frequency range. The dynamic absorber may be designed to reduce a magnitude of vibrations having frequencies in a second frequency range. The second frequency range may include at least one frequency not in the frequency range.

The dynamic absorber may define an annular cavity. The dynamic absorber mass may be disposed in the annular cavity.

A shock absorber assembly includes a first absorber, a dynamic absorber, and a third absorber. The dynamic absorber includes a dynamic absorber mass and a spring. The third absorber is attachable to a vehicle body. The dynamic absorber is attachable to a wheel. The first absorber is attached to the third absorber. The first absorber is attachable to the wheel. The first absorber is a semi-active shock absorber. The dynamic absorber mass and the spring are tuned to a specified frequency. The first absorber, the dynamic absorber, and the third absorber are unitary.

The third absorber may be a low-amplitude, high-frequency absorber.

With reference to the Figures, wherein like numerals indicate like parts throughout the several views, a vehicle shock absorbing system 10, 10' in a vehicle 12 includes a wheel 14, a vehicle body 15, a first absorber 16, 78, 92, a dynamic absorber 18, 18', and a third absorber 20, 20'. The third absorber 20, 20' is attached to the vehicle body 15. The first absorber 16, 78, 92 is between the third absorber 20, 20' and the wheel 14. The dynamic absorber 18, 18' is attached to the wheel 14 and includes a dynamic absorber mass 22, 22' and a spring 24, 24'.

The first absorber 16, 78, 92, the dynamic absorber 18, 18' and the third absorber 20, 20' absorb vibrations from the vehicle body 15 and the wheel 14 over a specified range of frequencies. The dynamic absorber 18, 18' may advantageously reduce magnitudes of vibrations having frequencies that the first absorber 16, 78, 92 and the third absorber 20, 20' may not reduce. Thus, the competing design challenge of absorbing vibrations of the wheel 14 and of the vehicle body 15 may be resolved by using the dynamic absorber 18, 18' to absorb vibrations not fully absorbed by the first absorber 16, 78, 92 and the third absorber 20, 20'. Fewer vibrations are then transmitted to other vehicle components. The vehicle shock absorbing system 10, 10' thus isolates an entire range of road inputs of interest, reducing vibrations of the wheel 14 and the vehicle body 15.

When the vehicle 12 travels on an uneven road surface that causes the wheel 14 and the vehicle body 15 to vibrate, the wheel 14 vibrates at a wheel resonant frequency and the vehicle body 15 vibrates at a body resonant frequency. The wheel resonant frequency may be 10-12 Hertz (Hz), and the body resonant frequency may be 1-1.2 Hz. The uneven road surface generates an input signal to the wheel 14 and to the vehicle body 15. The wheel 14 and the vehicle body 15 generate an output signal as energy from the uneven road surface moves the wheel 15 and the vehicle body 15. The vibrations each have a magnitude and a phase. The magnitude is a measure of a magnification of an amplitude of the vibration due to sweeping frequency road inputs. The magnitude is measured in decibels (dB), which quantify a ratio of an amplitude of the output signal to an amplitude of the input signal. The phase is a measure of a delay of the output signal relative to the input signal.

The vibrations at the body resonant frequency may be felt by vehicle occupants. To produce a more comfortable ride for the vehicle occupants, shock absorbers in a suspension may be designed to absorb vibrations at the body resonant frequency. Cameras and image processing software may preview the road ahead of the vehicle 12, allowing the suspension to prepare for uneven road surfaces. The cameras and image processing software may estimate when the uneven road surfaces will reach front wheels 14 and rear wheels 14.

Absorbing vibrations at the body resonant frequency leaves vibrations at the wheel resonant frequency, and vibrations above the body resonant frequency remain unabsorbed. The unabsorbed frequencies may affect handling of the vehicle 12, and additional devices to absorb the frequencies may be included. Such devices may include, e.g., hydraulic devices, pneumatic devices, hydraulic-pneumatic devices, electromechanical devices, etc. Vibrations at frequencies above 20 Hz may propagate through the vehicle body 15 and cause audible noise detectable by vehicle occupants, i.e., "secondary ride issues." The first absorber 16, 78, 92, the dynamic absorber 18, 18', and the third absorber 20, 20' absorb vibrations at respective frequency ranges to provide a comfortable ride for the occupants, to improve handling and comfort of the vehicle 12, and to reduce the audible noise to resolve the secondary ride issues.

Shock absorbers may be classified as one of "passive," "active," and "semi-active." A "passive" shock absorber absorbs vibrations without additional input to the passive shock absorber. The properties of the components of the passive shock absorber determine the ability of the passive shock absorber to absorb vibrations. The properties may include, e.g., a viscosity of a hydraulic fluid, a stiffness of a spring, a mass of an absorber mass, etc. For example, the passive shock absorber may be a twin-tube shock absorber that includes a first tube, a second tube, a piston disposed in the second tube, a fluid orifice connecting the first tube and the second tube, and hydraulic fluid that moves between the first tube and the second tube through the fluid orifice. The viscosity of the hydraulic fluid and the mass of the piston may determine the properties of the twin-tube shock absorber.

An "active" shock absorber includes a component that introduces an energy-absorbing medium to reduce vibrations absorbed by the active shock absorber. The energy-absorbing medium may be additional hydraulic fluid. For example, the active shock absorber may include a hydraulic actuator, a source of energy, e.g., a pump, a first tube, a second tube, and a piston disposed in the second tube. The hydraulic actuator may move hydraulic fluid from a fluid reservoir to one of the first tube and the second tube, increasing a hydraulic fluid pressure and slowing the piston, absorbing additional vibrations.

A "semi-active" shock absorber includes a component that actively controls at least one portion of the semi-active shock absorber but does not add energy to absorb the vibrations. The semi-active shock absorber may include movable portions that adjust damping characteristics of the semi-active shock absorber without actively increasing energy to absorb the vibrations. For example, the semi-active shock absorber may be a semi-active twin-tube shock absorber that includes a valve, a controller, a first tube, a second tube, and a piston disposed in the second tube. The valve may connect the first tube of the twin-tube shock absorber to the second tube of the twin tube shock absorber, and the controller may be programmed to selectively open and close the valve to allow fluid to move between the first tube and the second tube. The movement of fluid between the first tube and the second tube may slow movement of the piston to absorb additional vibrations.

A semi-active and active suspension control, such as a sky hook suspension system, may include active shock absorbers and active control to absorb vibrations from the vehicle body 15. The active suspension uses sensors to obtain signals for feedback control. The sensors have time delays when collecting data. When the wheel 14 contacts the uneven road surface, the time delays of the active suspension may be greater than a time for the wheel 14 to vibrate, and the active suspension thus may not reduce vibrations of the wheel 14 completely.

Figure 4:
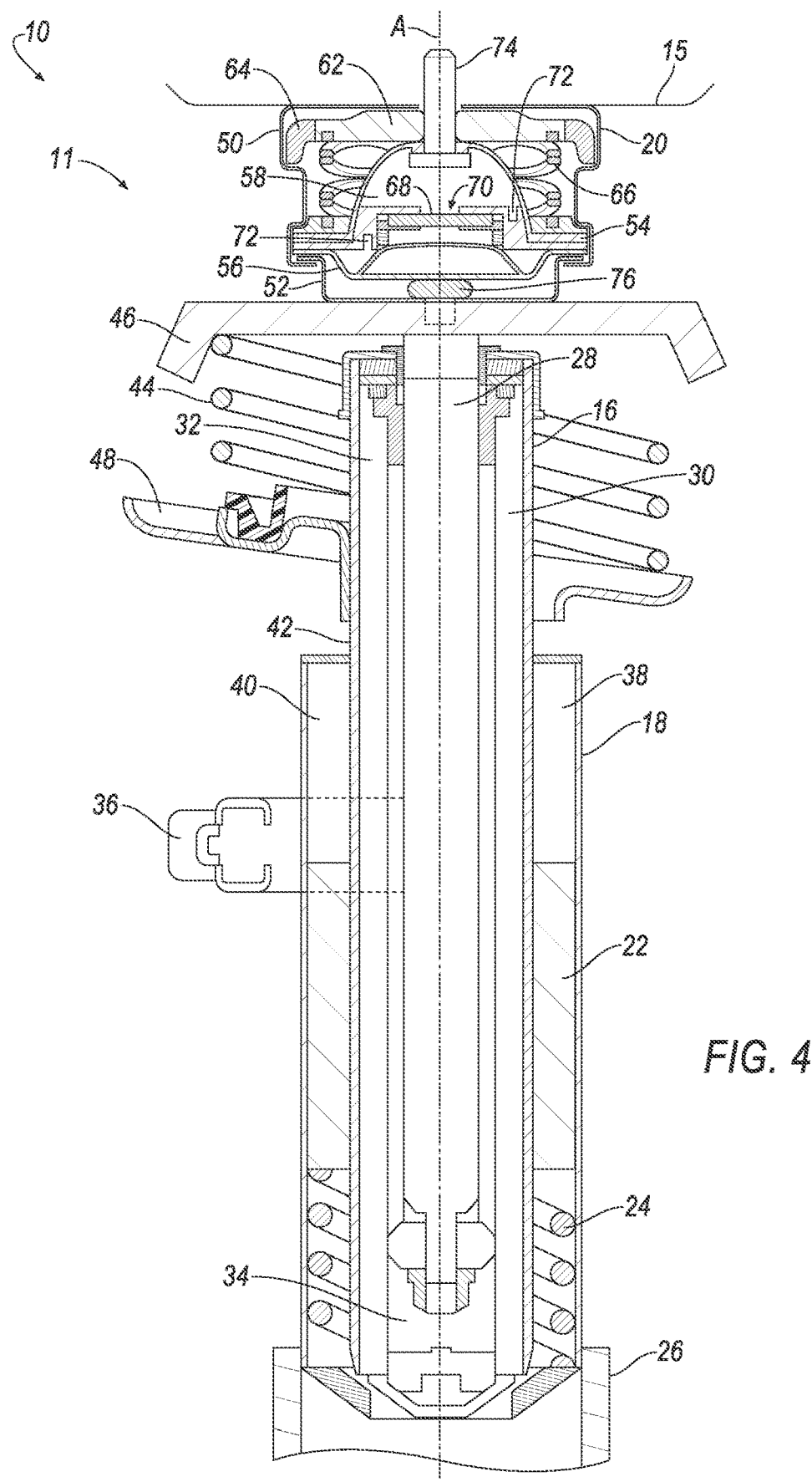
FIG. 4 is a cross-sectional view of the vehicle shock absorbing system.
Figure 6:
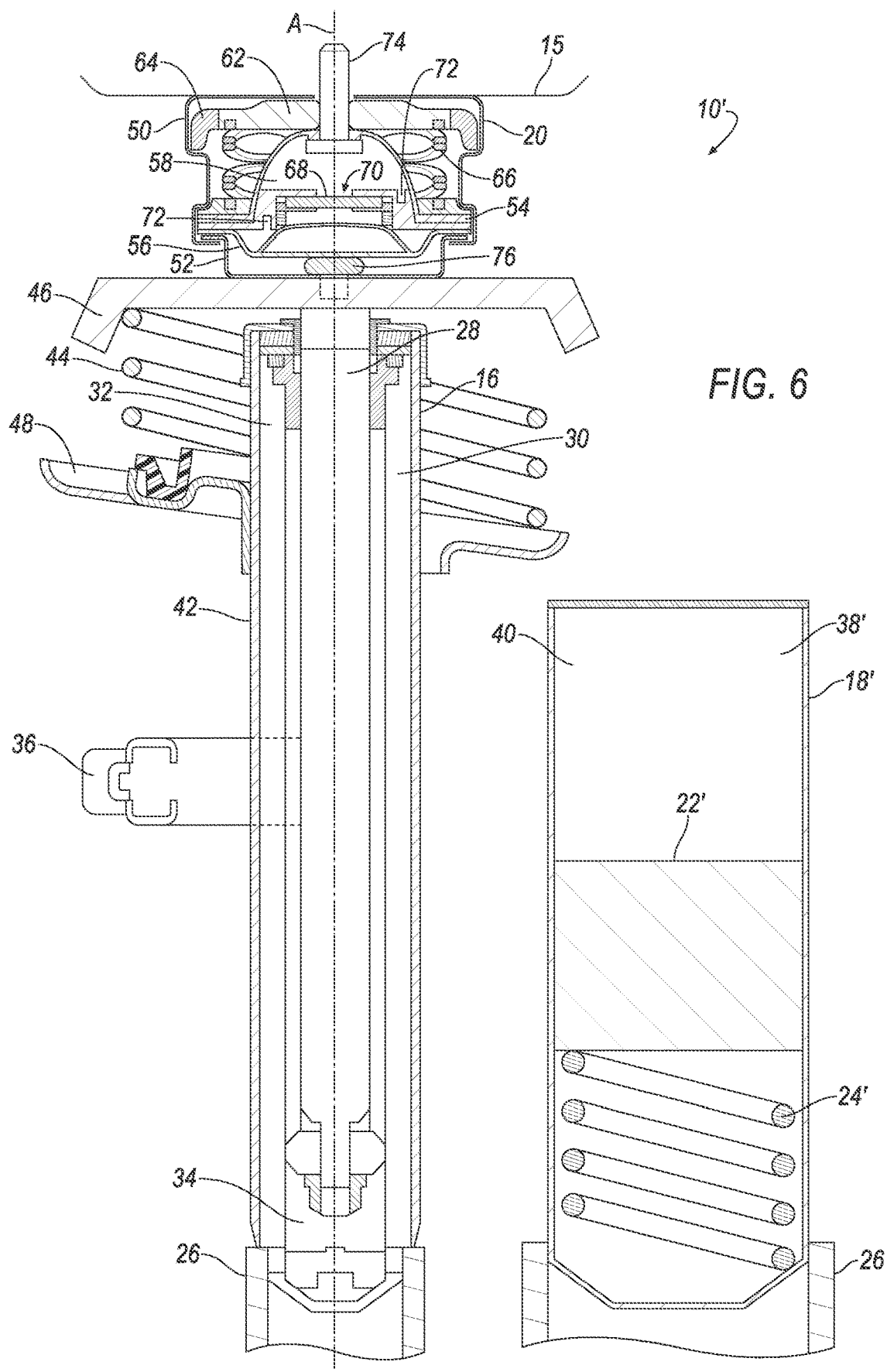
FIG. 6 is a cross-sectional view of the second embodiment of the vehicle shock absorbing system.

As shown in FIG. 1, the vehicle 12 includes the vehicle shock absorbing system 10. As shown in FIGS. 4 and 6, the vehicle 12 includes the vehicle body 15. The vehicle may have a body-on-frame construction (also referred to as a cab-on-frame construction). In other words, the vehicle 12 includes the vehicle body 15 and a frame that are separate components, i.e., are modular, and the vehicle body 15 is supported on and affixed to the frame. As another example not shown in the Figures, the vehicle architecture may be a unibody construction, i.e., a unitary-body construction, in which the vehicle body 15 and the frame are unitary. The vehicle body 15 and/or the frame can be formed of any suitable material, e.g., steel, aluminum, etc.

The vehicle 12 includes the wheel 14. The wheel 14 is a rotatable component that engages a roadway to move the vehicle 12. The wheel 14 may include a tire that contacts the roadway, and as the wheel 14 rotates, the wheel 14 may pull the vehicle body 15. The wheel 14 includes the steering knuckle 26, as shown in FIGS. 1, 4, 6. The steering knuckle 26 connects a hub (not shown) of the wheel 14 to the vehicle shock absorbing system 10. The steering knuckle 26 may connect a steering rack (not shown) to the hub and may transmit movement from the steering rack to the hub, turning the wheel 14 to steer the vehicle 12. As shown in FIG. 1, the vehicle 12 may include a plurality of wheels 14, e.g., two wheels 14 shown in FIG. 1 and two wheels 14 hidden by a passenger cabin of the vehicle 12, totaling four wheels 14. When the wheel 14 moves along the roadway, an uneven surface of the roadway may cause the wheel 14 to vibrate. The uneven surface and subsequent vibrations may result from, e.g., changes in road grade, cracks in the roadway, potholes, speed bumps, gravel, etc. The wheel 14 may be constructed of, e.g., a metal, a metal alloy, a polymer, carbon fiber, a composite, etc. The wheel 14 has a mass that may depend on, e.g., a size of the wheel 14, the material from which the wheel 14 is constructed, etc. The resonant frequency of the wheel 14 is based on the mass of the wheel 14 and a tire spring rate, as described below.

Figure 2:
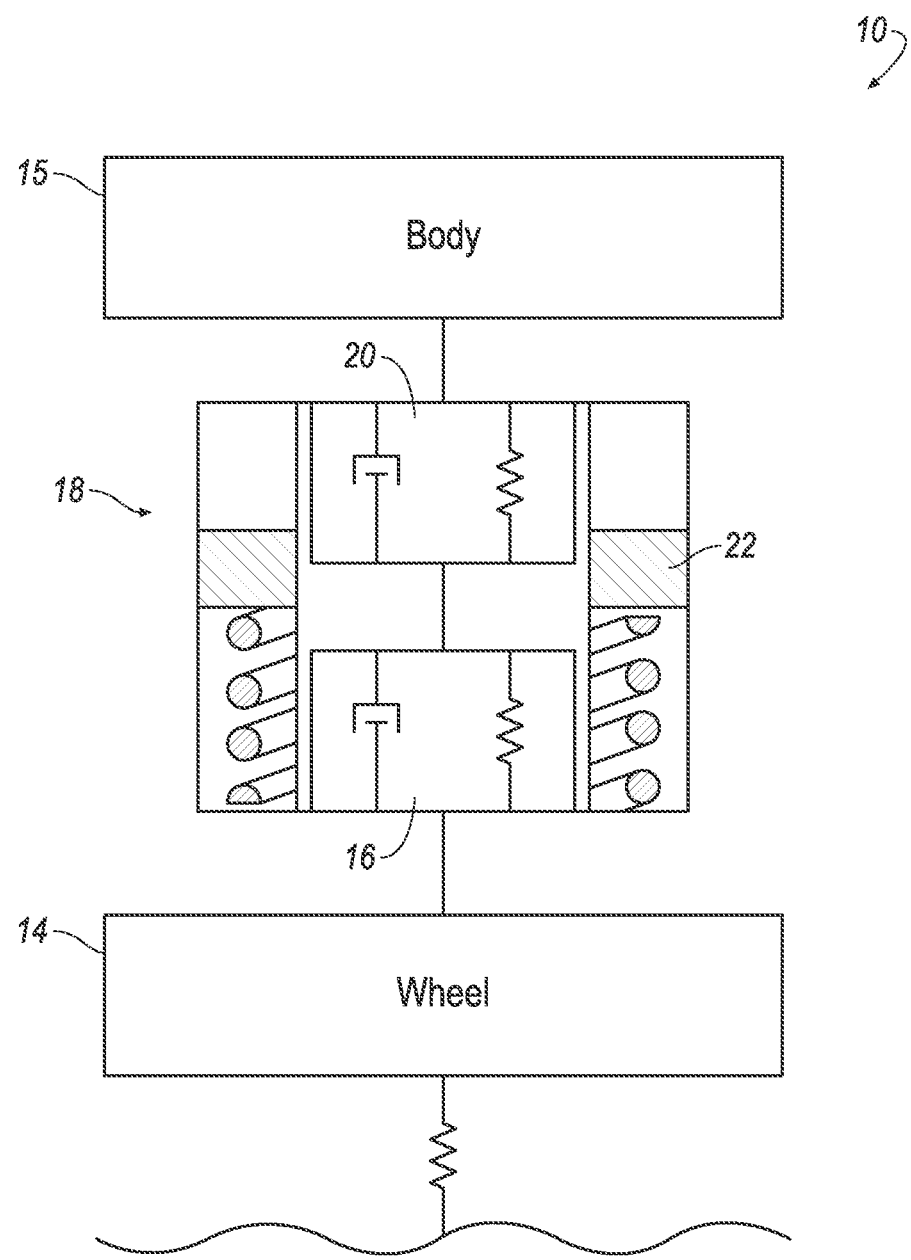
FIG. 2 is a schematic view of a vehicle shock absorbing system.

As shown in FIG. 2, the vehicle shock absorbing system 10 may be represented in a schematic diagram. In FIG. 2, the wheel 14 is represented as connected to earth with a spring, such that vibrations would be transmitted to the first absorber 16, the dynamic absorber 18, and the third absorber 20. The first absorber 16 and the third absorber 20 are illustrated as a spring-damper device and are arranged in series. The third absorber 20 is connected to the vehicle body 15 and to the first absorber 16. The first absorber 16 is connected to the third absorber 20 and to the wheel 14. The dynamic absorber 18 is illustrated around the first absorber 16 and the third absorber 20.

Figure 3:
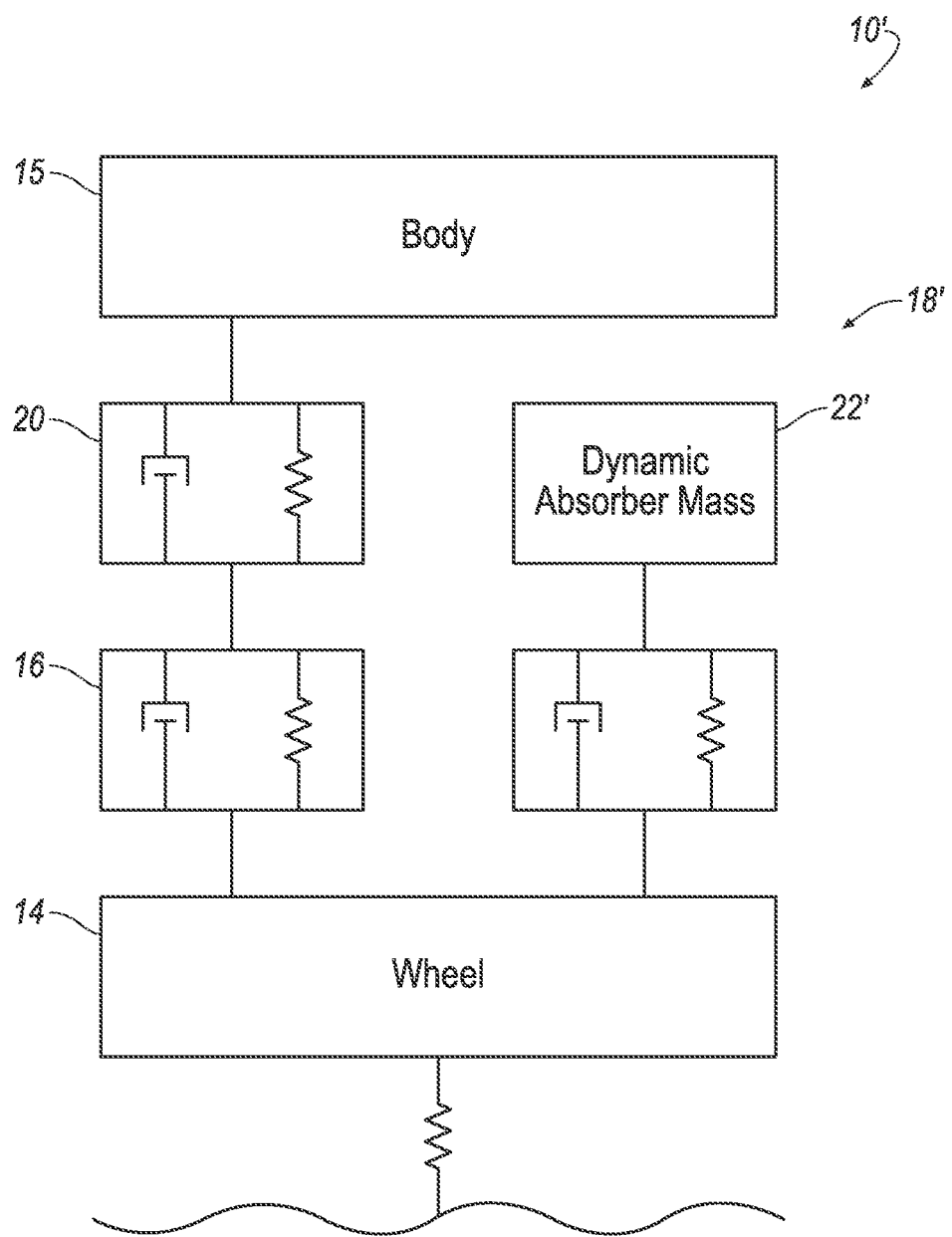
FIG. 3 is a schematic view of a second embodiment of the vehicle shock absorbing system.

As shown in FIG. 3, the vehicle shock absorbing system 10' may be represented in a schematic diagram. In FIG. 3, the wheel 14 is represented as connected to earth with a spring. The first absorber 16 and the third absorber 20 are illustrated as a spring-damper device and are arranged in series. The first absorber 16 is connected to the third absorber 20 and to the wheel 14. The dynamic absorber 18' is attachable to the wheel 14 in parallel with the first absorber 16.

The vehicle shock absorbing system 10, 10' includes the first absorber 16, as shown in FIGS. 4 and 6. The first absorber 16 is attachable to the wheel 14. The first absorber 16 may be connected to the steering knuckle 26, as shown in FIGS. 4 and 6. Alternatively, the first absorber 16 may be connected to the wheel 14 at a suitable location. For example, a rear wheel 14 that may not be used for steering the vehicle 12 may lack a steering knuckle 26, and the first absorber 16 may be connected to the wheel 14 at a different location, e.g., a wheel assembly, a wheel bearing housing, etc. The first absorber 16 may be designed to absorb vibrations having a frequency from 0-30 (rad/s) (about 0-5 Hz) and magnitudes from 40-60 decibels (dB). The first absorber 16 may absorb vibrations of the vehicle body 15 that have higher magnitudes but lower frequencies. The first absorber 16 may include an absorbing mass 28 and a hydraulic fluid 30. When the absorbing mass 28 moves in the hydraulic fluid 30 from the vibration, the absorbing mass 28 generates viscous friction, reducing the magnitude of the vibration. The absorbing mass 28 may be a piston.

The first absorber 16 may include a first fluid chamber 32 and a second fluid chamber 34. The first fluid chamber 32 may be a cylindrical tube. The second fluid chamber 34 may be a cylindrical tube. The second fluid chamber 34 may be disposed in the first fluid chamber 32. The first fluid chamber 32 and the second fluid chamber 34 may contain the hydraulic fluid 30. The absorbing mass 28 may be disposed in the second fluid chamber 34. The absorbing mass 28 may be shaped to move in the second fluid chamber 34. For example, the absorbing mass 28 may be cylindrically shaped. The absorbing mass 28 may move axially in the second fluid chamber 34, generating viscous friction with the hydraulic fluid 30 to absorb the vibration.

The first absorber 16 may be a semi-active shock absorber. The first absorber 16 may include a valve 36, 116 connecting the first fluid chamber 32 to the second fluid chamber 34. The valve 36, 116 may be, e.g., a solenoid valve. A controller (not shown) may selectively open the valve 36, 116, allowing the hydraulic fluid 30 to move from the first fluid chamber 32 to the second fluid chamber 34. When absorbing a vibration, the valve 36, 116 may allow the hydraulic fluid 30 to move from the first fluid chamber 32 to the second fluid chamber 34, and from the second fluid chamber 34 to the first fluid chamber 32. When the hydraulic fluid 30 moves between the first fluid chamber 32 and the second fluid chamber 34, the absorption properties of the hydraulic fluid 30 may vary, allowing the hydraulic fluid 30 to absorb additional vibration energy from the absorbing mass 28. For example, a pressure of the hydraulic fluid 30 in the second fluid chamber 34 may increase, absorbing more additional energy from the absorbing mass 28. The hydraulic fluid 30 may absorb vibrations at specified frequencies, increasing the absorption of the vibration by the second absorber 18.

Figure 14:
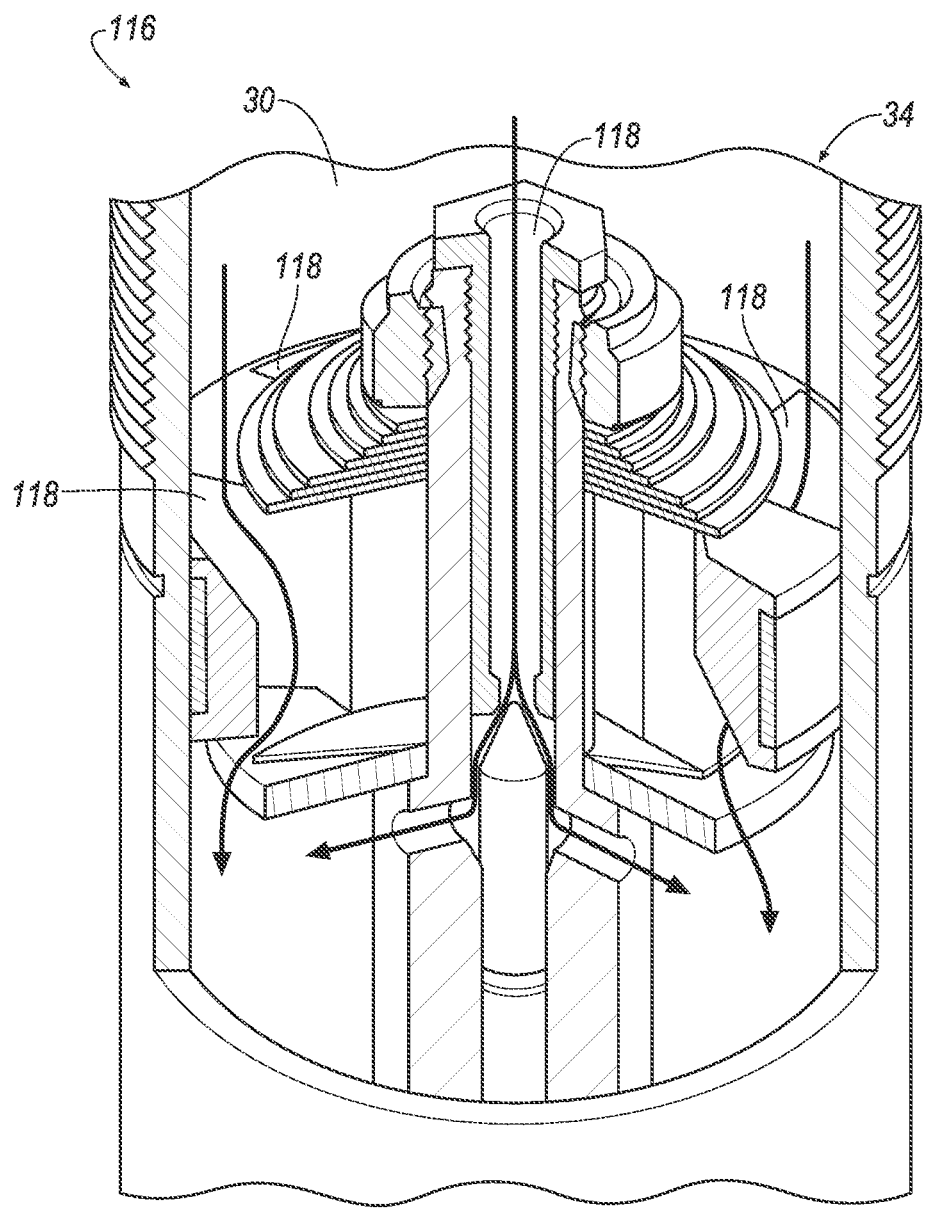
FIG. 14 is a cross-sectional view of an internal valve.

FIGS. 4 and 6 show the valve 36 disposed external to the first fluid chamber 32 and the second fluid chamber 34. Alternatively, as shown in FIG. 14, the valve 116 may be disposed in the second fluid chamber 34. The valve 116 includes channels 118 that allow the hydraulic fluid 30 to move between the first fluid chamber 32 and the second fluid chamber 34. As described above, the controller may open the channels 118 to control flow of the hydraulic fluid 30 between the first fluid chamber 32 and the second fluid chamber 34.

As shown in FIGS. 4 and 6, the vehicle shock absorbing system 10 may include a coil spring 44, an upper plate 46, and a lower plate 48. The coil spring 44 may absorb vibrations from the wheel 14. The coil spring 44 may be attached to the upper plate 46. The first absorber 16 may be attached to the upper plate 46. The third absorber 20 may be attached to the upper plate 46. The upper plate 46 may be disposed between the first absorber 16 and the third absorber 20. The lower plate 48 may be attached to the outer surface 42 of the first absorber 16. The coil spring 44 may be attached to the lower plate 48. The coil spring 44 may be disposed between the upper plate 46 and the lower plate 48. When the wheel 14 receives a vibration, the first absorber 16 may move the lower plate 48 toward the upper plate 46, compressing the coil spring 44. The compression of the coil spring 44 absorbs at least a portion of the energy from the vibration, reducing movement of the upper plate 46 and reducing the amount of the vibration transmitted to the vehicle body 15.

Figure 11:
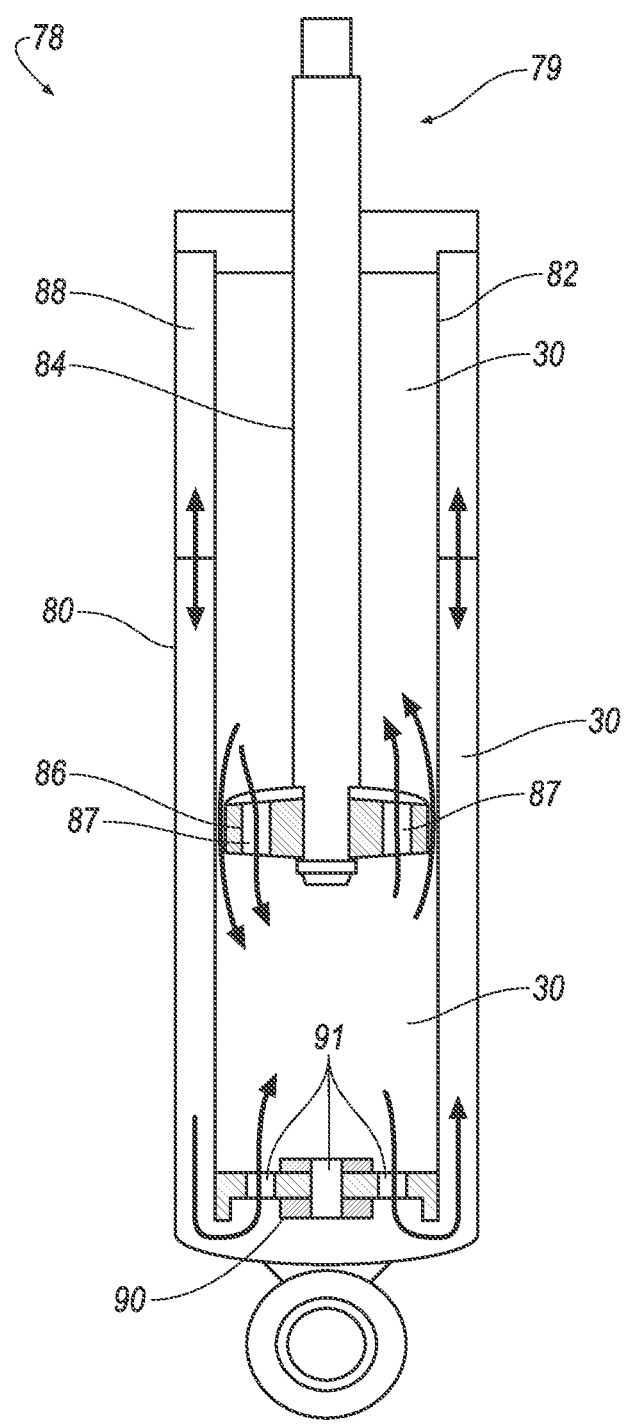
FIG. 11 is a cross-sectional view of a passive shock absorber.

As shown in FIG. 11, the first absorber may be a passive twin-tube shock absorber 78. The passive twin-tube shock absorber 78 includes an external tube 80 and an internal tube 82. The passive twin-tube shock absorber 78 includes an absorbing mass 79 disposed in the internal tube 82. The absorbing mass 79 includes a rod 84 and a piston 86. The piston 86 defines channels 87 that allow hydraulic fluid 30 to pass through the piston 86. The internal tube 82 includes hydraulic fluid 30. The absorbing mass 79 moves along the internal tube 82, dissipating energy to the hydraulic fluid 30. The external tube 82 includes hydraulic fluid 30 and absorber gas 88. The absorber gas 88 may be nitrogen. The passive twin-tube shock absorber 78 includes a base valve 90. The base valve 90 includes channels 91 that allow hydraulic fluid to move between the external tube 80 and the internal tube 82.

Upon receiving a vibration, the passive twin-tube shock absorber 78 undergoes a compression and a rebound. In the compression, the rod 84 is depressed and moves toward the base valve 90, the pressure of the hydraulic fluid 30 between the piston 86 and the base valve increases. The hydraulic fluid 30 moves through the channels 87 through the piston 86 and through the base valve 90 into the external tube 80. The hydraulic fluid 30 increases pressure in the absorber gas 88.

In the rebound, the rod 84 and the piston 86 move away from the base valve 90, increasing pressure of the hydraulic fluid 30 between the piston 86 and an upper end of the internal tube 82. Hydraulic fluid 30 moves through the channels 87 of the piston 86. Hydraulic fluid 30 moves from the external tube 80 through the base valve 90 into the internal tube 82, equalizing the pressure in the internal tube 82 between the piston 86 and the base valve 90. The volume of hydraulic fluid 30 pumped depends primarily on a displacement x of the piston 86, and the intensity of flow depends primarily of a velocity v of the piston 86 relative to the internal tube 84. The resistance to motion of the piston 86 depends on the resultant force from pressure acting on the piston 86 and from both dry and viscous friction.

Figure 12A:
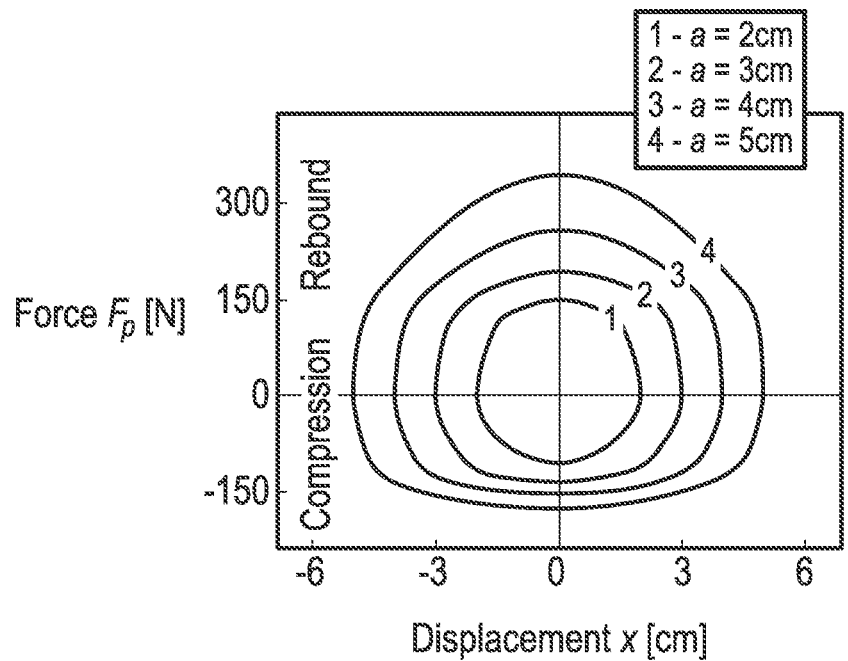
FIG. 12A is a chart of a plurality of forces generated a plurality of vibrations, each vibration having a different amplitude.
Figure 12B:
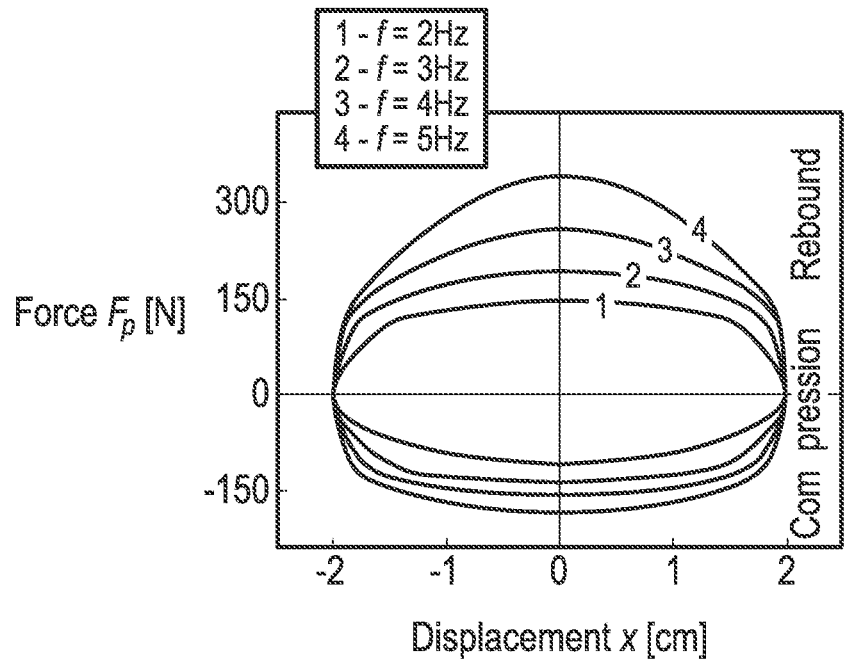
FIG. 12B is a chart of a second plurality of forces generated a second plurality of vibrations, each vibration having a different frequency.

FIGS. 12A-12B show the force $F_p$ generated by the displacement x of the piston 86 in the passive twin-tube shock absorber 78. The force $F_p$ is plotted in Newtons (N), and the displacement x is plotted in centimeters (cm). FIGS. 12A-12B show the force $F_p$ in the passive twin-tube shock absorber 78 with the base valve 90 having a cracking pressure, i.e., a pressure beyond which the base valve 90 allows fluid to flow, of 2 bar. FIG. 12A shows the force $F_p$ for four applied vibrations 1, 2, 3, 4. Each vibration 1, 2, 3, 4 in FIG. 12A has a frequency of 2 Hz. Each vibration in FIG. 12A has a different amplitude a: the vibration 1 has an amplitude a of 2 cm, the vibration 2 has an amplitude a of 3 cm, the vibration 3 has an amplitude a of 4 cm, and the vibration 3 has an amplitude a of 5 cm. FIG. 12B shows the force $F_p$ for four applied vibrations 1, 2, 3, 4. Each vibration 1, 2, 3, 4 in FIG. 12B has an amplitude a of 2 cm. Each vibration in FIG. 12B has a different frequency f: the vibration 1 has a frequency f of 2 Hz, the vibration 2 has a frequency f of 3 Hz, the vibration 3 has a frequency f of 4 Hz, and the vibration 4 has a frequency f of 5 Hz.

FIGS. 12A-12B show the change in the force $F_p$ during compression and rebound of the passive twin-tube shock absorber 78. For example, as shown in FIG. 12A, the vibration 2 having the amplitude a of 3 cm and frequency f of 2 Hz has a displacement x between −3 and 3 cm and generates a force $F_p$ between −150 and 150 N during compression and rebound. In another example, as shown in FIG. 12B, the vibration 2 having the amplitude a of 2 cm and the frequency f of 3 Hz has a displacement x between −2 and 2 cm and a force $F_p$ between −150 and 150 N during compression and rebound. As shown in FIGS. 12A-12B, the force $F_p$ generated by the displacement x may be nonlinear.

Figure 13:
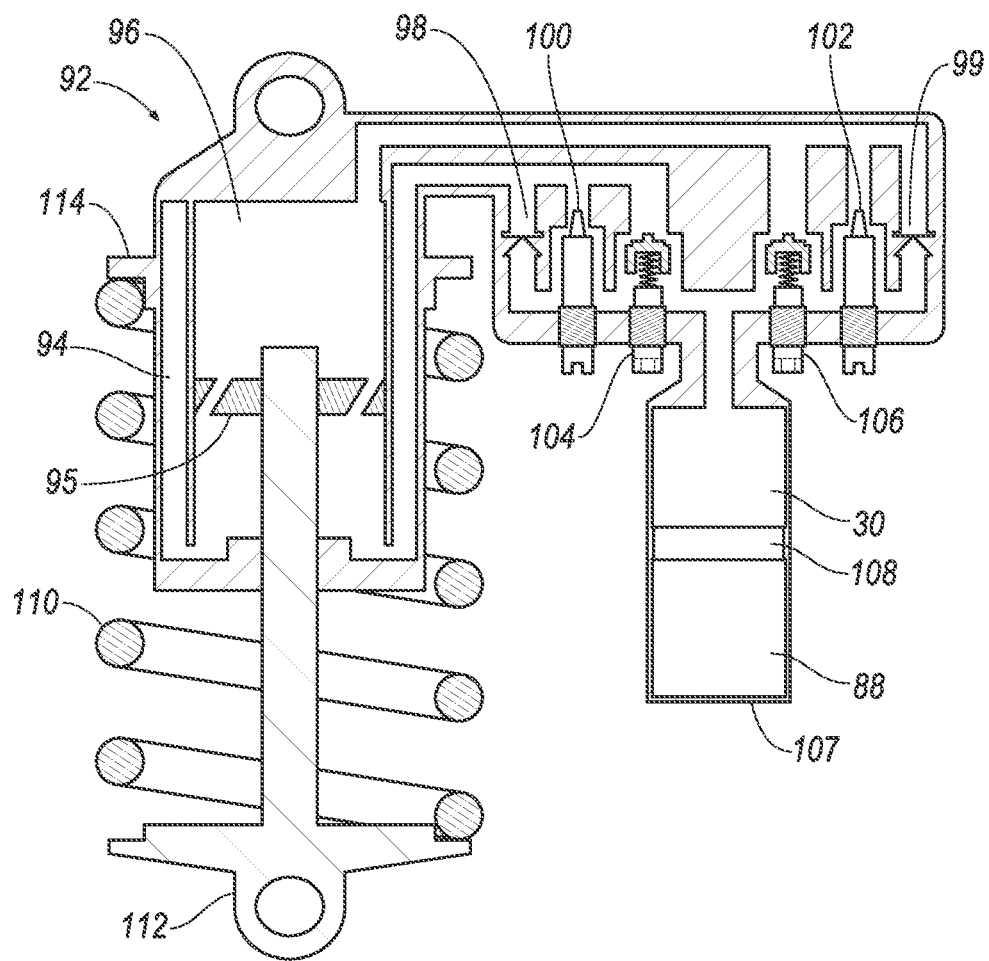
FIG. 13 is a cross-sectional view of a second embodiment of a passive shock absorber.

FIG. 13 shows a second embodiment of a passive twin-tube shock absorber 92. The passive twin-tube shock absorber 92 includes an outer tube 94 and an inner tube 96. A piston 95 moves in the inner tube 96, pushing hydraulic fluid 30 between the outer tube 94 and the inner tube 96. The passive twin-tube shock absorber 92 includes a reservoir 107.

The passive twin-tube shock absorber 92 includes a pair of check valves 98, 99, a solid stroke rebound valve 100, a solid stroke compression valve 102, a high-speed rebound valve 104, and a high-speed compression valve 106. The check valves 98, 99 are one-way valves that prevent hydraulic fluid 30 from moving toward the reservoir 107, forcing the hydraulic fluid 30 from the outer tube 94 and the inner tube 96 through the solid stroke rebound valve 100, the solid stroke compression valve 102, the high-speed rebound valve 104, and the high-speed compression valve 106. The check valve 98 allows the hydraulic fluid 30 to move from the reservoir 107 to the outer tube 94. The check valve 99 allows the hydraulic fluid to move from the reservoir 107 to the inner tube 96.

During compression, the hydraulic fluid 30 moves from the inner tube 96 toward the check valve 99, the solid stroke compression valve 102, and the high-speed compression valve 106. Based on a speed of movement of the piston 95, the hydraulic fluid 30 may flow through the solid stroke compression valve 102 and/or the high-speed compression valve 106.

Upon flowing through the solid stroke compression valve 102 and/or the high-speed compression valve 106, the hydraulic fluid 30 may flow into a reservoir 107. The reservoir 107 includes a dividing piston 108 that divides the hydraulic fluid 30 from compression gas 88. The hydraulic fluid 30 may flow through the solid stroke compression valve 102 and/or the high-speed compression valve 106 toward the check valve 98. The check valve 98 allows the hydraulic fluid 30 to flow through toward the outer tube 94.

During rebound, the hydraulic fluid 30 moves from the outer tube 94 toward the check valve 98, the solid stroke rebound valve 100, and the high-speed compression valve 106. Based on a speed of movement of the piston 95, the hydraulic fluid 30 may flow through the solid stroke rebound valve 100 and/or the high-speed rebound valve 104 to the reservoir. The hydraulic fluid 30 may flow through the check valve 99 toward the inner tube 96.

The passive twin-tube shock absorber 92 includes a spring 110, a lower plate 112, and an upper plate 114. The lower plate 112 is connected to the piston 95. When the passive twin-tube shock absorber 92 receives a vibration, the lower plate 112 compresses the spring 110 toward the upper plate 114, moving the piston 95 in the inner tube 96. The spring 110 absorbs energy from the vibration.

Figure 8:
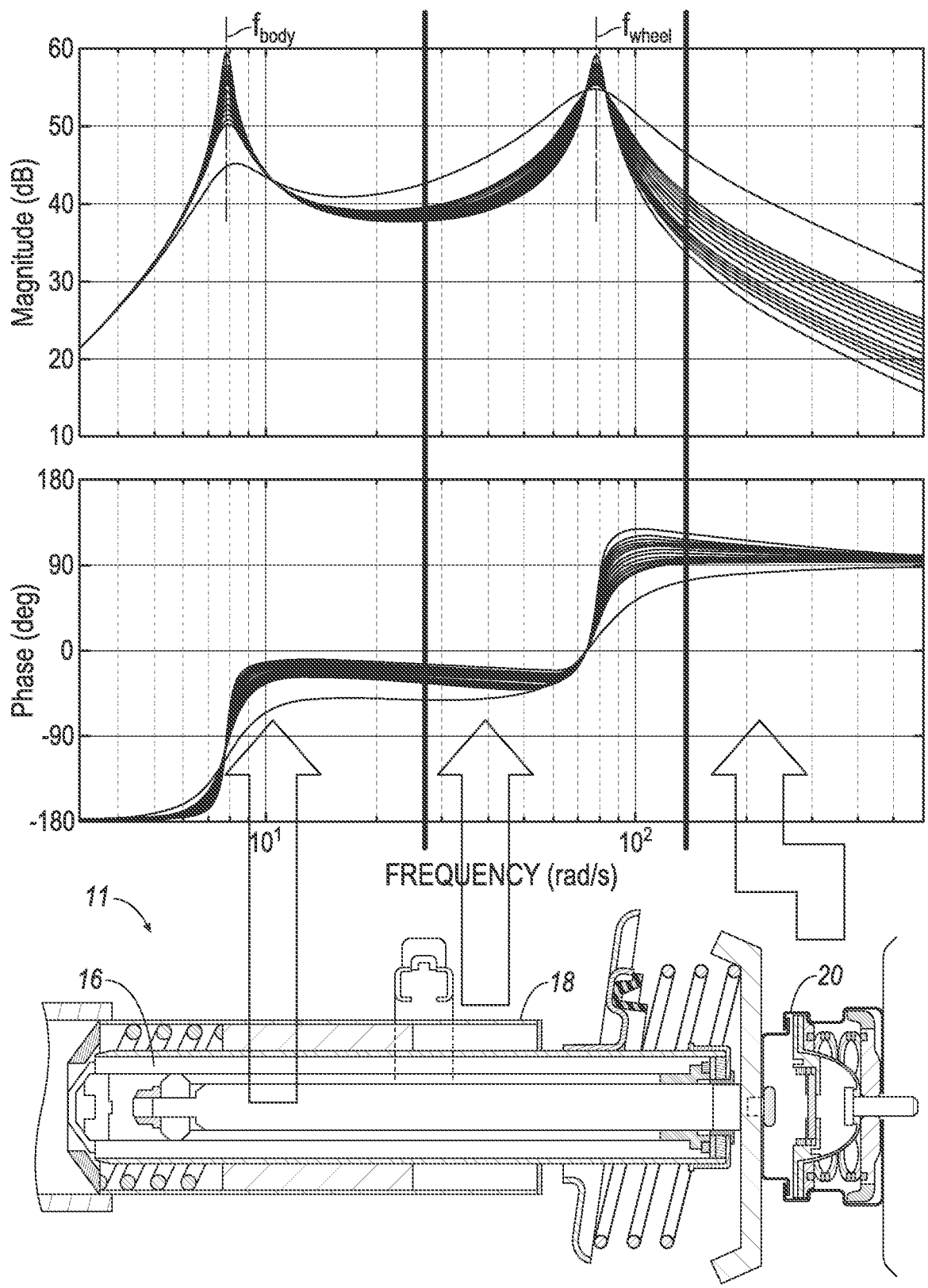
FIG. 8 is a chart of vibrations of the vehicle without the vehicle shock absorbing system.
Figure 9:
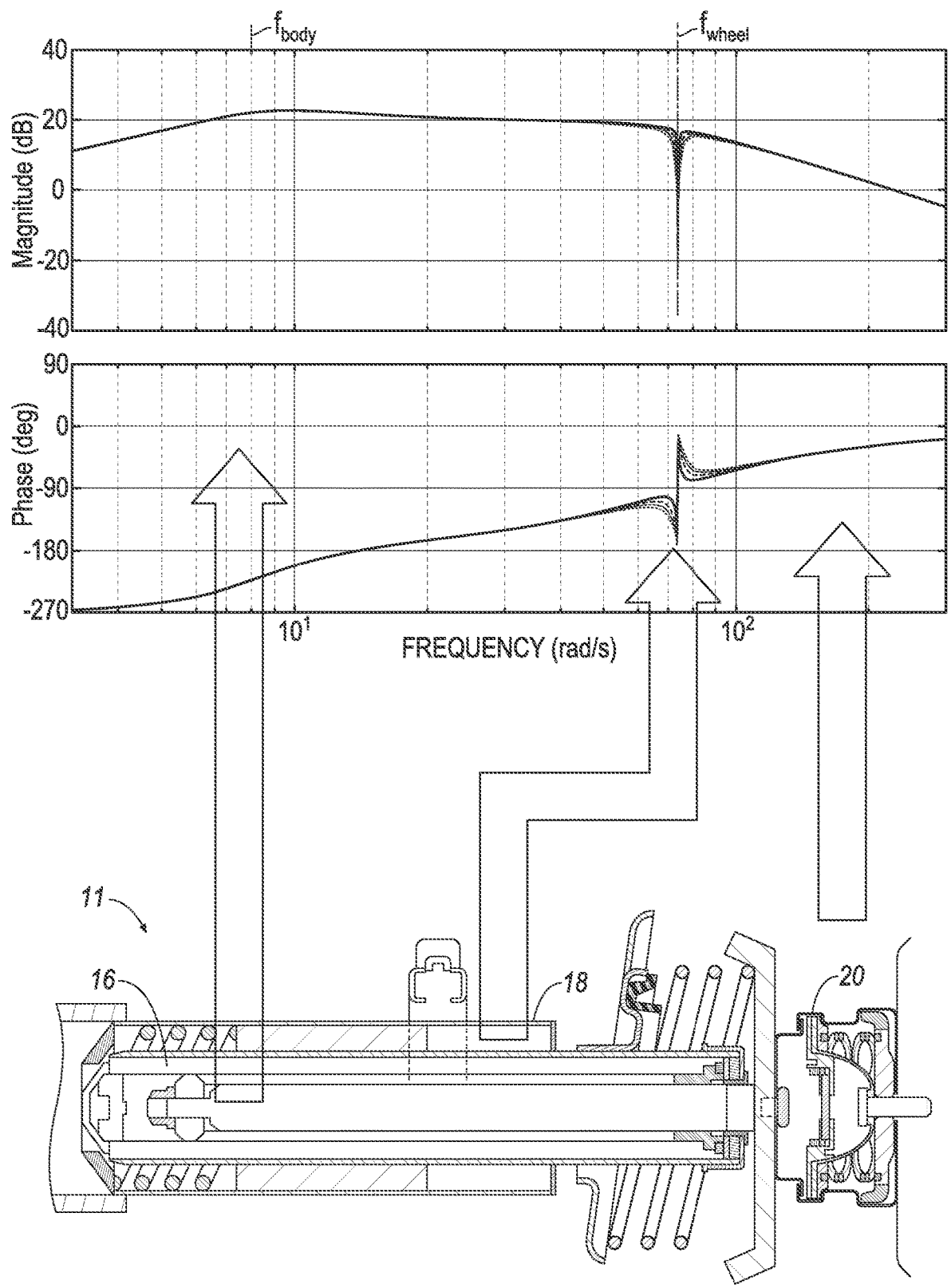
FIG. 9 is a chart of vibrations of the vehicle with the vehicle shock absorbing system.

The first absorber 16, 78, 92 may be a high magnitude, low frequency absorber. As described above, the first absorber 16, 78, 92 may be attached to the steering knuckle 26, which transmits vibrations through the first absorber 16, 78, 92 to the vehicle body 15. The vehicle body 15, having a higher mass than the wheel 14, vibrates at frequencies lower than the vibrations of the wheel 14 and at magnitudes higher than vibrations of the wheel 14, as shown in FIGS. 8-9. To absorb vibrations of the vehicle body 15, the first absorber 16, 78, 92 is designed to absorb the higher magnitude, lower frequency vibrations.

The vehicle shock absorbing system 10, 10' includes the dynamic absorber 18, 18'. The dynamic absorber 18, 18' may be referred to as a "second" absorber 18, 18'. FIG. 4 shows a first embodiment of the dynamic absorber 18 in the vehicle shock absorbing system 10. FIG. 6 shows a second embodiment of the dynamic absorber 18' in the vehicle shock absorbing system 10'. The dynamic absorber 18, 18' includes the dynamic absorber mass 22, 22' and the spring 24, 24'. FIGS. 4 and 6 show the spring 24, 24' and the dynamic absorber mass 22, 22' arranged linearly, and the dynamic absorber mass 22, 22' may move linearly relative to the spring 24, 24'. Alternatively, not shown in the Figures, the spring 24, 24' may be a leaf spring and the dynamic absorber mass 22, 22' may be connected to the spring 24 such that the dynamic absorber mass 22, 22' swings relative to the spring 24, 24'. The mass of the dynamic absorber mass 22, 22' and the stiffness of the spring 24, 24' are determined such that the dynamic absorber 18, 18' has a resonant frequency substantially equal to the wheel resonant frequency. For example, the dynamic absorber mass 22, 22' may be substantially 10% of the mass of the wheel 14. In another example, the dynamic absorber mass 22, 22' may be less than 10% of the mass of the wheel 14.

Figure 5:
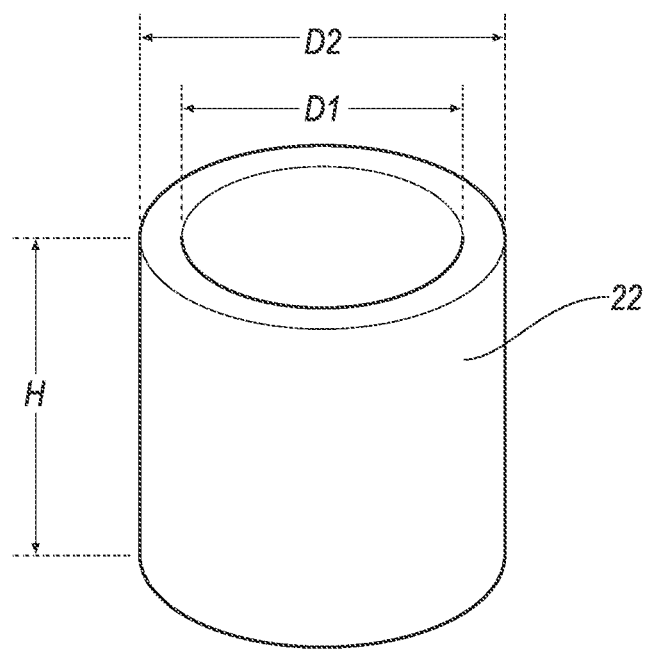
FIG. 5 is a perspective view of a dynamic absorber mass of the vehicle shock absorbing system of FIG. 4.

The dynamic absorber 18, 18' is attached to the steering knuckle 26. The dynamic absorber 18, 18' may be mounted to the steering knuckle 26, as shown in FIGS. 3 and 5. Alternatively, the dynamic absorber 18, 18' may be attached to the wheel 14 at a suitable location. For example, a rear wheel 14 that may not be used for steering the vehicle 12 may lack a steering knuckle 26, and dynamic absorber 18, 18' may be attached to the wheel 14 at a different location, e.g., a wheel assembly, a wheel bearing housing, etc. The dynamic absorber 18, 18' may be fastened to the steering knuckle 26 with a fastener, e.g., a bolt, a nut, a dowel, a pin, a press-fit, etc. Alternatively, the dynamic absorber 18, 18' may be mounted to the steering knuckle 26 with an intermediate fastener, e.g., bracket, a plate, etc. The dynamic absorber 18, 18' may be designed to absorb vibrations having frequencies from 30-120 rad/s. The dynamic absorber 18, 18' may absorb vibrations not absorbed by the first absorber 16, 78, 92 and the third absorber 20, 20'. The dynamic absorber 18, 18' may absorb vibrations that the first absorber 16, 78, 92 and the third absorber 20, 20' may only partially absorb, increasing the absorption of those vibrations. The dynamic absorber 18, 18' may be designed to absorb vibrations at a resonant frequency of the wheel 14, as described below. For example, a stiffness of the spring 24, 24' and a mass of the dynamic absorber mass 22, 22' may be selected to absorb vibrations at the resonant frequency of the wheel 14.

The dynamic absorber 18, 18' defines a cavity 38, 38'. The dynamic absorber mass 22, 22' may be disposed in the cavity 38, 38'. The cavity 38, 38' may include hydraulic fluid 40 such as the hydraulic fluid 30 used in the first absorber 16, 78, 92. The dynamic absorber mass 22, 22' and the cavity 38, 38' may be designed to reduce friction between the dynamic absorber mass 22, 22' and an inner surface of the dynamic absorber 18, 18', allowing freer movement of the dynamic absorber mass 22, 22' in the cavity 38, 38'. The cavity 38 may be annular, i.e., shaped as an annulus, as shown in FIG. 4. When the cavity 38 is annular, the dynamic absorber mass 22 may be annular. As shown in FIG. 5, the dynamic absorber mass 22 has an inner diameter D1 and an outer diameter D2. The inner diameter D1 is larger than a diameter of the first absorber 16, and the outer diameter D2 is smaller than the diameter of the dynamic absorber 18, allowing the dynamic absorber mass 22 to move freely within the cavity 38.

Figure 7:
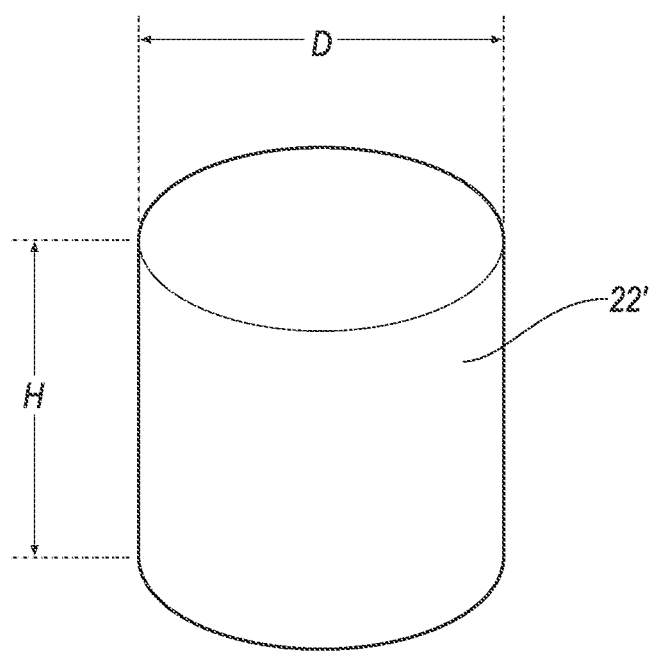
FIG. 7 is a perspective view of a dynamic absorber mass of the vehicle shock absorbing system of FIG. 6.

As another example, the cavity 38' may be cylindrical. When the cavity 38' is cylindrical, the dynamic absorber mass 22' may be cylindrical. As shown in FIG. 7, the dynamic absorber mass 22' has a diameter D that is smaller than the diameter of the dynamic absorber 18'. As shown in FIGS. 5, 7, the dynamic absorber mass 22, 22' may have a height H. The diameters D, D1, D2 and the height H may be determined to absorb vibrations with specific frequencies, e.g., the resonant frequency of the wheel 14.

The dynamic absorber 18' may be attached to the wheel 14 in parallel with the first absorber 16, as shown in FIG. 6. The dynamic absorber 18' and the first absorber 16 may each be attached to the wheel 14 such that the wheel 14 independently transmits vibrations to each of the dynamic absorber 18' and the first absorber 16. Thus, movement of the first absorber 16 from vibrations may not affect absorption of vibrations by the dynamic absorber 18'.

The dynamic absorber 18 may be disposed around an outer surface 42 of the first absorber 16, as shown in FIG. 4. When the dynamic absorber 18 has an annular shape, the dynamic absorber 18 may be positioned such that the first absorber 16 is disposed in the inner space defined by the annular shape. Disposing the dynamic absorber 18 around the outer surface 42 of the first absorber 16 may reduce the amount of space required for the dynamic absorber 16 and the first absorber 16.

The vehicle shock absorbing system 10, 10' includes the third absorber 20, 20'. The third absorber 20, 20' may be attachable to the vehicle body 15. The third absorber 20, 20' may be a high-frequency, low-amplitude absorber. In other words, the third absorber 20, 20' may absorb vibrations having higher frequencies and lower amplitudes than frequencies and amplitudes of vibrations absorbed by the first absorber 16, 78, 92 and vibrations absorbed by the dynamic absorber 18, 18'. The third absorber 20, 20' may be designed to absorb vibrations having a frequency from 120-300 radians per second (rad/s) (about 10-50 Hertz (Hz)) and having magnitudes from 0-20 decibels dB. That is, the third absorber 20, 20' absorbs vibrations of the wheel 14 that may oscillate more quickly, but may have a lower amplitude, than vibrations of the vehicle body 15.

As shown in FIGS. 4 and 6, the third absorber 20 may include an upper housing 50 and a lower housing 52. The upper housing 50 may move relative to the lower housing 52. As the third absorber 20 receives vibrations, the upper housing 50 and the lower housing 52 may move relative to each other, absorbing the vibrations.

The third absorber 20 may include a fluid chamber upper housing 54 and a fluid chamber lower housing 56 that define a fluid chamber 58. The fluid chamber upper housing 54 may be disposed in the upper housing 50. The fluid chamber lower housing 56 may be disposed in the lower housing 52. The fluid chamber 58 stores a hydraulic fluid 60. The hydraulic fluid 60 may be, e.g., a magnetorheological fluid, oil, etc.

The third absorber 20 may include a head 62. The head 62 moves within the upper housing 50, absorbing additional energy from the vibrations. The head 62 may be attached to the fluid chamber upper housing 54. The head 62 may include a circumferential band 64 and a spring 66. The circumferential band 64 may reduce transverse movement of the head 62, e.g., movement of the head 62 away from an axis A. The circumferential band 64 may be constructed of a suitable material, e.g., rubber, plastic, etc. The spring 66 may be attached to the head 62 and to the fluid chamber upper housing 54. The spring 66 in FIGS. 4 and 6 is shown as a disc spring, and the spring 66 may be of any suitable type, e.g., a coil spring, a disc spring, etc. As the third absorber 20 receives vibrations, the head 62 may move along the axis A and the spring 66 may absorb energy from the vibration.

The third absorber 20 may include a decoupler 68. The decoupler 68 may be a plate that separates the fluid chamber upper housing 54 from the fluid chamber lower housing 56. The fluid chamber upper housing 54 and the fluid chamber lower housing 56 may define a channel 70 and a track 72.

The channel 70 and the track 72 allow the hydraulic fluid 60 to move in the fluid chamber 58. The track 72 may be sized smaller than the channel 70.

The decoupler 68 is separate from the fluid chamber upper housing 54 and the fluid chamber lower housing 56 and may float freely within the channel 70. When the third absorber 20 receives vibrations, the fluid chamber upper housing 54 may move away from the fluid chamber lower housing 56, and the movement of the hydraulic fluid 60 may push against the decoupler 68, blocking the channel 70 and forcing the hydraulic fluid 60 to move through the track 72. Because the track 72 is sized smaller than the channel 70, pressure in the hydraulic fluid 60 increases to move the hydraulic fluid 60 through the track 72, increasing absorption of the vibration by the hydraulic fluid 60. The decoupler 68, the channel 70, and the track 72 may be designed such that the decoupler 68 blocks the channel 70 at specific frequencies, e.g., frequencies in a specified frequency range, and allows the hydraulic fluid 60 to move through the channel 70 at specific frequencies, e.g., frequencies outside of the specified frequency range.

For high-magnitude fluid displacements caused by road inputs, the movement of fluid chamber upper housing 54 may push more hydraulic fluid 60 toward the channel 70, moving the decoupler 68 and allowing hydraulic fluid 60 to move between the fluid chamber upper housing 54 and the fluid chamber lower housing 56 through the channel 70. The increased amount of hydraulic fluid 60 moving through the channel 70 may absorb energy from the vibration.

The third absorber 20 may include an upper fastener 74 and a lower fastener 76. The upper fastener 74 may attach the upper housing 50 to the vehicle body 15. The lower fastener 76 may attach the lower housing 52 to the upper plate 46. The upper fastener 74 and the lower fastener 76 may be, e.g., press-fit dowels, pins, bolts, screws, etc. The upper fastener 74 and the lower fastener 76 may align with the axis A, aligning the third absorber 20 with the first absorber 16.

Figure 15:
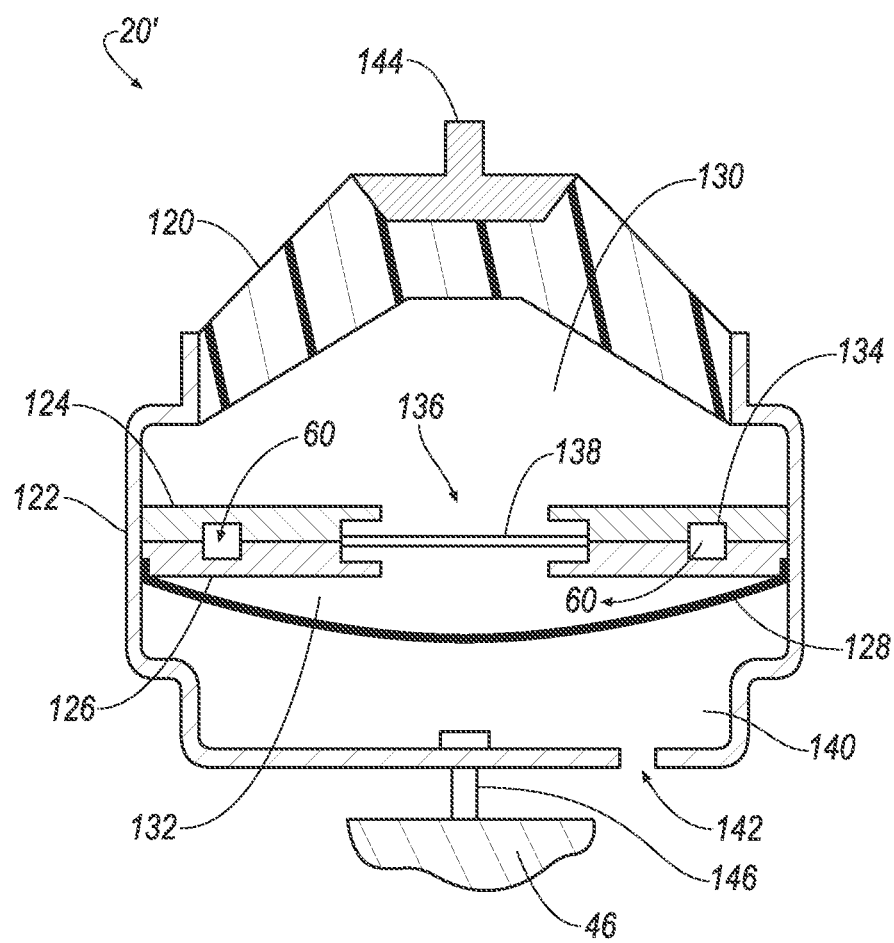
FIG. 15 is a cross-sectional view of a second embodiment of a third absorber.

As shown in FIG. 15, the vehicle shock absorbing system 10, 10' may include an alternative embodiment of the third absorber 20'. The third absorber 20' includes a rubber spring 120 and a housing 122. The housing 122 includes an upper cage 124, a lower cage 126, and a rubber bellow 128.

The rubber spring 120 and the upper cage 124 define an upper fluid chamber 130. The lower cage 126 and the rubber bellow 128 define a lower fluid chamber 132. The upper cage 124 and the lower cage 126 define an inertia track 134 and a channel 136. The inertia track 134 and the channel 136 allow hydraulic fluid 60 to move between the upper fluid chamber 130 and the lower fluid chamber 132. The inertia track 134 may cause a time delay of the hydraulic fluid 60 moving between the upper fluid chamber 130 and the lower fluid chamber 132, absorbing energy from the vibration. The time delay may reduce fluid wave propagation within the third absorber 20' for small fluid displacements. The inertia track 134 may generate fluid friction in the hydraulic fluid 60, absorbing energy from the vibration.

The third absorber 20' includes a decoupler 138 disposed in the channel 136. As described above, the decoupler 138 may be a plate that separates the upper fluid chamber 130 from the lower fluid chamber 132. The decoupler 136 is separate from the upper cage 124 and the lower cage 126 and may float freely within the channel 138. When the third absorber 20' receives vibrations, the rubber spring 120 may move toward upper cage 126, and the movement of the hydraulic fluid 60 may push against the decoupler 138, blocking the channel 136 and forcing the hydraulic fluid 60 to move through the inertia track 134. Because the inertia track 134 is sized smaller than the channel 136, pressure in the hydraulic fluid 60 increases to move the hydraulic fluid 60 through the inertia track 134, increasing absorption of the vibration by the hydraulic fluid 60.

For large fluid displacements caused by road inputs, the movement of the rubber spring 120 may push more hydraulic fluid 60 toward the channel 136, moving the decoupler 138 and allowing hydraulic fluid 60 to move between the upper fluid chamber 130 and the lower fluid chamber 132 through the channel 136. The increased amount of hydraulic fluid 60 moving through the channel 70 may absorb energy from the vibration.

The decoupler 138, the channel 136, and the inertia track 134 may be designed such that the decoupler 138 blocks the channel 136 at specific frequencies, e.g., frequencies in a specified frequency range, and allows the hydraulic fluid 60 to move through the channel 136 at specific frequencies, e.g., frequencies outside of the specified frequency range.

The rubber bellow 128 and the housing 122 define an air chamber 140. The housing 122 defines an air gap 142. Movement of the hydraulic fluid 60 may push the rubber bellow 128 into the air chamber 140. The air gap 142 allows air to move to and from the air chamber 140, maintaining atmospheric pressure in the air chamber 140 and allowing the rubber bellow 128 to move without additional pressure from air in the air chamber 140.

The third absorber 20' may include an upper fastener 144 and a lower fastener 146. The upper fastener 144 may attach the rubber spring 120 to the vehicle body 15. The lower fastener 146 may attach the housing 122 to the upper plate 46. The upper fastener 144 and the lower fastener 146 may be, e.g., press-fit dowels, pins, bolts, screws, etc. The upper fastener 144 and the lower fastener 146 may align with the axis A, aligning the third absorber 20' with the first absorber 16.

The first absorber 16 and the third absorber 20 may be attached coaxially, as shown in FIGS. 4 and 6. That is, the first absorber 16 and the third absorber 20 may be attached along the axis A extending through the first absorber 16 and the third absorber 20. By attaching the first absorber 16 to the third absorber 20 coaxially, the first absorber 16 and the third absorber 20 may absorb the vibrations at substantially the same time and may be disposed in the vehicle 12 in a smaller space than attaching the first absorber 16 separately from the third absorber 20.

As shown in FIG. 4, the dynamic absorber 18 may be coaxial with the first absorber 16 and the third absorber 20. As described above, the first absorber 16 and the third absorber 20 may be coaxial along the axis A. The dynamic absorber 18 may be positioned to be coaxial with the axis A, e.g., when the dynamic absorber 18 is disposed around the outer surface of the first absorber 16. When the dynamic absorber 18 is coaxial with the first absorber 16 and the third absorber 20, the vehicle shock absorbing system 10 may occupy less space than when the dynamic absorber 18 is separate from the first absorber 16 and the third absorber 20.

As shown in FIG. 4, the first absorber 16, the dynamic absorber 18, and the third absorber 20 may be unitary, i.e., are connected together and are each part of an entire unit. The first absorber 16, the dynamic absorber 18, and the third absorber 20 may be directly connected together with the lack of any intermediate components therebetween. In an example in which the first absorber 16, the dynamic absorber 18, and the third absorber 20 are unitary, the first absorber 16, the dynamic absorber 18, and the third absorber 20, as a unit, are a shock absorbing unit 11. The first absorber 16, the dynamic absorber 18, and the third absorber 20 are connected together and move together as a unit before installation to the vehicle 12 and are installed to the vehicle 12 as a unit. The shock absorbing unit 11 may be constructed as a single device installable as a unit between the vehicle body 15 and the steering knuckle 26. The shock absorbing unit 11 may reduce space occupied between the vehicle body 15 and the steering knuckle 26, reducing packaging size in limited available space in the vehicle 12. When the first absorber 16, the dynamic absorber 18, and the third absorber 20 are coaxial with the axis A, an overall width of the shock absorbing unit 11 may be reduced, taking less space when installed between the vehicle body 15 and the steering knuckle 26. The shock absorbing unit 11 thus may absorb vibrations with less additional space consumed.

As shown in FIGS. 8-9, the vehicle 12 may absorb vibrations having frequencies from 0-600 rad/s (about 0-80 Hz) and having magnitudes from 0-60 dB. FIGS. 8-9 show the shock absorbing unit 11 horizontally, showing frequency ranges corresponding to vibrations absorbed by each of the first absorber 16, 78, 92, the dynamic absorber 18, 18' (also referred to as the "second" absorber 18, 18'), and the third absorber 20, 20'. The vibrations may result from the uneven surface of the roadway (e.g., gravel, potholes, speed bumps, etc.) transmitted to the wheel 14 and the vehicle body 15 though the steering knuckle 26. Vibrations having specific frequencies may have higher magnitudes than vibrations having other frequencies. For example, the chart of FIG. 8 shows two frequencies at which vibrations have magnitudes greater than 40 dB. These two frequencies represent resonant frequencies of the vehicle body 15 and the wheel 14, $f_{body}$, $f_{wheel}$, respectively. The body resonant frequency $f_{body}$ may be about 6-8 rad/s (1-1.2 Hz), and the wheel resonant frequency $f_{wheel}$ may be about 60-80 rad/s (10-12 Hz), as described above. The resonant frequency is a natural frequency of vibration determined by physical parameters of an object such as the vehicle body 15 and the wheel 14. When vibrations are transmitted to the object at or near the resonant frequency, the vibrations cause the object to oscillate at the resonant frequency, increasing the magnitude of the overall vibration absorbed by the first absorber 16, 78, 92, the second absorber 18, 18', and the third absorbers 20, 20'.

To reduce the magnitude of vibrations near the resonant frequencies $f_{body}$, $f_{wheel}$, the first absorber 16, 78, 92, the second absorber 18, 18', and the third absorber 20, 20' may be designed to dampen vibrations having frequencies in specific frequency ranges, i.e., to reduce the magnitude of vibrations having frequencies in the specific frequency ranges.

The first absorber 16, 78, 92 may be designed to dampen a plurality of frequencies in a first frequency range. FIGS. 8-9 show the shock absorbing unit 11, which includes the first absorber 16. While not shown in FIGS. 8-9, the passive shock absorbers 78, 92 may be designed to dampen the plurality of frequencies in the first frequency range. The first frequency range may include frequencies from 0-30 rad/s. The first frequency range may be determined to absorb vibrations from the vehicle body 15. That is, the first frequency range may include the body resonant frequency $f_{body}$. Thus, the first absorber 16, 78, 92 may be designed to reduce vibrations felt by vehicle occupants and improve ride comfort for the occupants.

The second absorber 18, 18' may be designed to dampen a plurality of frequencies in a second frequency range. FIGS. 8-9 show the shock absorbing unit 11, which includes the second absorber 18. While not shown in FIGS. 8-9, the second absorber 18' may be designed to dampen the plurality of frequencies in the second frequency range. The second frequency range may include at least one frequency not in either of the first frequency range and a third frequency range, described below. The second frequency range may include frequencies from 30-120 rad/s. The second frequency range includes the wheel resonant frequency $f_{wheel}$. The wheel resonant frequency $f_{wheel}$ depends on the mass of the wheel 14, e.g., a different material composition that changes the mass of the wheel 14 changes the wheel resonant frequency $f_{wheel}$, and the tire spring rate. In other words, the tire may act as a spring, and the spring has a spring constant, i.e., a stiffness. The tire spring rate is the spring constant of the spring. The tire spring rate may depend on, e.g., the material composition of the tire, inflation of the tire, etc. The second absorber 18, 18' may be designed to have the second frequency range to include the wheel resonant frequency $f_{wheel}$ of the specific wheel 14, e.g., the mass of the dynamic absorber mass 22, 22' and the stiffness of the spring 24, 24' may be determined such that the resonant frequency of the second absorber 18, 18' is substantially equal to the wheel resonant frequency $f_{wheel}$.

The third absorber 20, 20' may be designed to dampen a plurality of frequencies in a third frequency range. FIGS. 8-9 show the shock absorbing unit 11, which includes the third absorber 20. While not shown in FIGS. 8-9, the third absorber 20' may be designed to dampen the plurality of frequencies in the third frequency range. The third frequency range may include frequencies above the wheel resonant frequency $f_{wheel}$. The third frequency range may include frequencies between 120-300 rad/s. The third frequency range may include frequencies that may produce audible noise in the vehicle 12. Thus, the third absorber 20, 20' may be designed to resolve the secondary ride issues.

As shown in FIG. 9, the second absorber 18, 18' may reduce the magnitude of vibrations having frequencies near the wheel resonant frequency, i.e., between 60-80 rad/s. The magnitude of vibrations having frequencies near the wheel resonant frequency $f_{wheel}$ may decrease from about 60 dB, as shown in FIG. 8, to about −30 dB, as shown in FIG. 9. The reduction in magnitude of the vibrations may reduce oscillation of the wheel 14 at the wheel resonant frequency $f_{wheel}$, reducing the resonant effect of the wheel resonant frequency $f_{wheel}$.

In addition to reducing magnitudes of the vibrations, the first absorber 16, 78, 92, the second absorber 18, 18' and the third absorber 20, 20' may reduce the phase of the vibrations. As described above, the phase is a measure of a delay of the output signal of the vibration relative to the input signal of the vibration. The first absorber 16, 78, 92, the second absorber 18, 18', and the third absorber 20, 20' may reduce the phase to about 90° or 270°, reducing the waveforms that are aligned and reducing the magnitude of the vibration.

Figure 10:
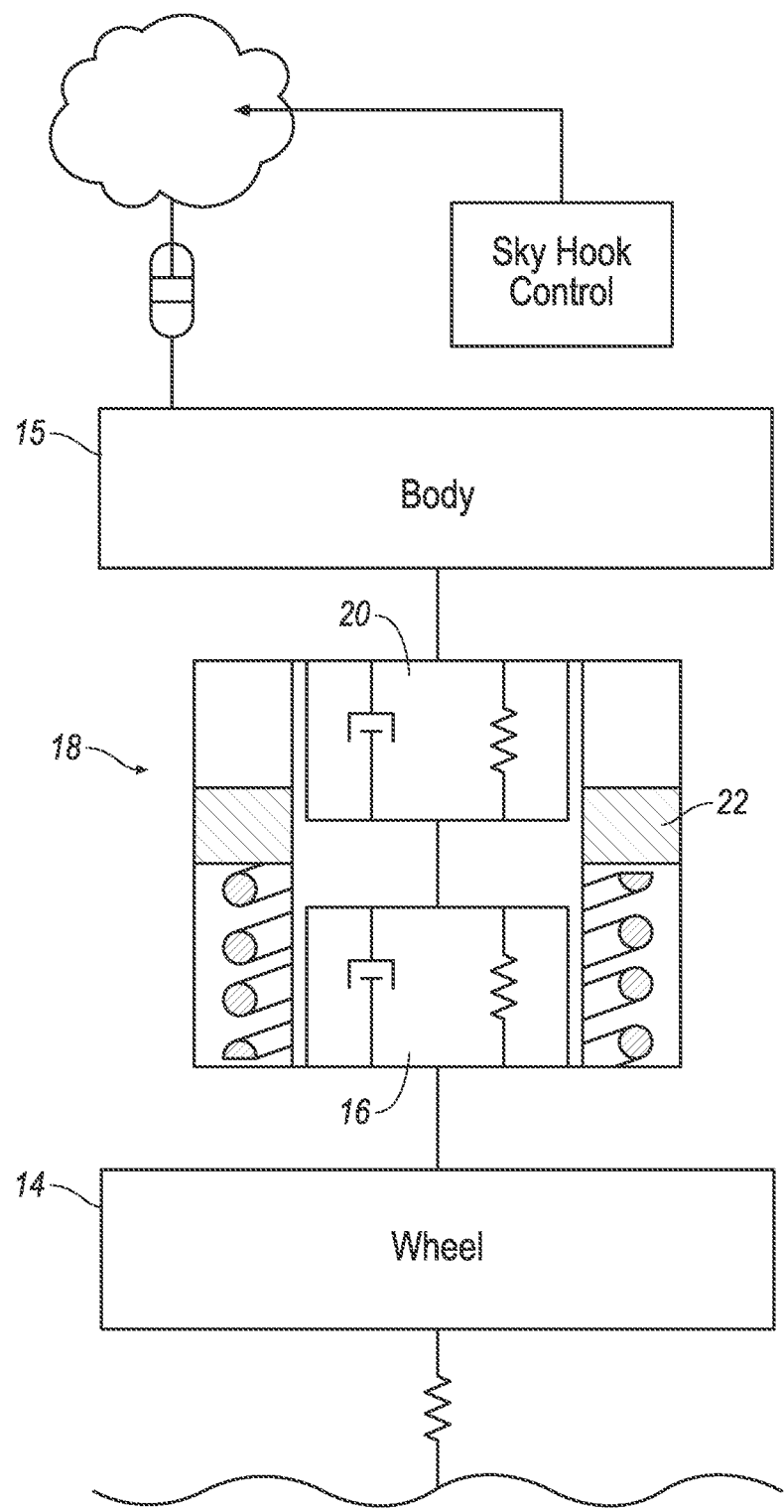
FIG. 10 is a schematic view of the vehicle shock absorbing system with a sky hook control.

The vehicle shock absorbing system 10 may be incorporated with an active control system, e.g., a sky hook control system, as shown in FIG. 10 in a schematic diagram. In FIG. 10, the vehicle body 15 is shown connected to a damper, and the damper is shown connected to a line into the sky, represented as a cloud. The sky hook control system may dampen vibrations of the vehicle body 15 by controlling the valve 36, 116 of the first absorber 16 to move the hydraulic fluid 30 in the first absorber 16. To dampen vibrations of the wheel 14, the dynamic absorber 18, 18' is designed to dampen vibrations at the wheel resonant frequency $f_{wheel}$ without input from the sky hook system. That is, the dynamic absorber 18, 18' is designed such that mechanical movement of the dynamic absorber mass 22, 22' and the spring 24, 24' absorb vibrations at the wheel resonant frequency $f_{wheel}$. Thus, the sky hook control system and the dynamic absorber 18, 18' reduce vibrations of the wheel 14 and of the vehicle body 15. Alternatively, the dynamic absorber 18, 18' may be used with a different active control system to reduce vibrations of the wheel 14 and of the vehicle body 15.

The third absorber 20, 20' isolates high-frequency, low-magnitude road inputs, as shown in FIGS. 8-9. The high-frequency, low-magnitude road inputs may generate audible noise in the vehicle 12, as described above. The third absorber 20, 20' resolves the secondary ride issues by absorbing the high-frequency, low-magnitude road inputs and reducing audible noise in the vehicle 12. Thus, the first absorber 16, 78, 92 the dynamic absorber 18, 18', and the third absorber 20, 20' may improve ride comfort for the vehicle occupants, the handling of the vehicle 12, and the secondary ride issues from audible noise.

The disclosure has been described in an illustrative manner, and it is to be understood that the terminology which has been used is intended to be in the nature of words of description rather than of limitation. The numerical adjectives used herein, e.g., "first" and "second," are used merely as identifiers, and do not indicate order or importance of the modified nouns. Many modifications and variations of the present disclosure are possible in light of the above teachings, and the disclosure may be practiced otherwise than as specifically described.

What is claimed is:

1. A system, comprising:
   a wheel having a wheel resonant frequency;
   a vehicle body having a body resonant frequency;
   a first absorber, a dynamic absorber, and a third absorber;
   the third absorber attached to the vehicle body;
   the first absorber between the third absorber and the wheel, the first absorber including a solenoid valve; and
   the dynamic absorber attached to the wheel and including a housing defining a cavity, a dynamic absorber mass, and a spring, the dynamic absorber mass and the spring disposed in the cavity;
   wherein the first absorber is designed to dampen a plurality of frequencies in a first frequency range including the body resonant frequency, the dynamic absorber is designed to dampen a plurality of frequencies in a second frequency range including the wheel resonant frequency, the third absorber is designed to dampen a plurality of frequencies in a third frequency range;
   wherein the plurality of frequencies in the first frequency range that are dampened by the first absorber are not included in the plurality of frequencies in the third frequency range that are dampened by the third absorber, and the plurality of frequencies in the third frequency range that are dampened by the third absorber are not included in the plurality of frequencies in the first frequency range that are dampened by the first absorber;
   wherein the wheel resonant frequency is not in either of the first frequency range or the third frequency range.

2. The system of claim 1, wherein the cavity is annular.

3. The system of claim 1, wherein the dynamic absorber is attached to the wheel in parallel with the first absorber.

4. The system of claim 1, wherein the dynamic absorber is disposed around an outer surface of the first absorber.

5. The system of claim 1, wherein the dynamic absorber is coaxial with the first and third absorbers.

6. The system of claim 1, wherein the first absorber is a semi-active shock absorber.

7. The system of claim 1, wherein the first absorber includes a first fluid chamber and a second fluid chamber.

8. The system of claim 7, wherein the solenoid valve connects the first fluid chamber to the second fluid chamber.

9. The system of claim 1, wherein the first absorber, the dynamic absorber, and the third absorber are unitary.

10. A system, comprising:
    a semi-active shock absorber having an outer surface;
    a dynamic absorber including a housing defining a cavity, a spring, and a dynamic absorber mass, the dynamic absorber mass and the spring disposed in the cavity, the dynamic absorber disposed coaxially with the semi-active shock absorber and around the outer surface of the semi-active shock absorber; and
    a third shock absorber;
    wherein the semi-active shock absorber is designed to reduce a magnitude of vibrations having frequencies in a first frequency range including a body resonant frequency of a vehicle body, the dynamic absorber is designed to reduce a magnitude of vibrations having frequencies in a second frequency range including a wheel resonant frequency of a wheel, the second frequency range including at least one frequency not in the first frequency range, and the third shock absorber is designed to reduce a magnitude of vibrations having frequencies in a third frequency range;
    wherein the frequencies in the first frequency range are not included in the third frequency range, and the frequencies in the third frequency range are not included in the first frequency range.

11. The system of claim 10, wherein the semi-active shock absorber includes a first fluid chamber and a second fluid chamber.

12. The system of claim 11, further comprising a solenoid valve connecting the first fluid chamber to the second fluid chamber.

13. The system of claim 10, wherein the cavity is annular and the dynamic absorber mass is disposed in the annular cavity.

14. A shock absorber assembly, comprising:
    first absorber;
    a dynamic absorber including a housing defining a cavity, a dynamic absorber mass, and a spring, the dynamic absorber mass and the spring disposed in the cavity;
    a third absorber attachable to a vehicle body, the vehicle body having a body resonant frequency;
    the dynamic absorber attachable to a wheel, the wheel having a wheel resonant frequency;
    the first absorber attached to the third absorber and attachable to the wheel;
    wherein the first absorber is a semi-active shock absorber tuned to dampen a plurality of frequencies in a first frequency range including the body resonant frequency;
    wherein the dynamic absorber mass and the spring are tuned to dampen a plurality of frequencies in a second frequency range including the wheel resonant frequency;
    wherein the third absorber is tuned to dampen a plurality of frequencies in a third frequency range;
    wherein the first absorber, the dynamic absorber, and the third absorber are unitary;
    wherein the plurality of frequencies in the first frequency range that are dampened by the first absorber are not included in the plurality of frequencies in the third frequency range that are dampened by the third absorber, and the plurality of frequencies in the third frequency range that are dampened by the third absorber are not included in the plurality of frequencies in the first frequency range that are dampened by the first absorber;

wherein the wheel resonant frequency is not in either of the first frequency range or the third frequency range.

15. The shock absorber assembly of claim 14, wherein the third absorber is a low-amplitude, high-frequency absorber.

\* \* \* \* \*